United States Patent
Clark et al.

[15] 3,679,055
[45] July 25, 1972

[54] REVERSE OSMOSIS WATER PURIFIER

[72] Inventors: Timothy M. Clark, San Carlos; Henry Shanfield, Santa Ana; David L. Grunau, San Francisco, all of Calif.

[73] Assignee: Polymetrics, Incorporated, San Carlos, Calif.

[22] Filed: July 15, 1970

[21] Appl. No.: 54,922

[52] U.S. Cl. ........................... 210/110, 210/257, 210/258, 210/321, 210/349, 210/433
[51] Int. Cl. ....................................................... B01d 31/00
[58] Field of Search ................. 210/110, 116, 349, 416, 257, 210/258, 22, 23, 321, 433

[56] References Cited

UNITED STATES PATENTS 3,421,628  1/1969  Barnabe et al. .................... 210/321 X

*Primary Examiner*—Frank A. Spear, Jr.
*Attorney*—Owen, Wickersham & Erickson

[57] ABSTRACT

A water purifier for removing dissolved substances and solid impurities from water supplied at an elevated pressure to a reverse osmosis element located inside a pressurized storage tank. As purified water from the element is collected within the tank it further compresses air in the tank, which air is used to force the purified water from the tank when used. A valve connected in the conduit supplying water to the element is responsive to air pressure within the storage tank to cut off the water flow when the supply of purified water in the tank reaches a predetermined level.

7 Claims, 5 Drawing Figures

PATENTED JUL 25 1972 3,679,055
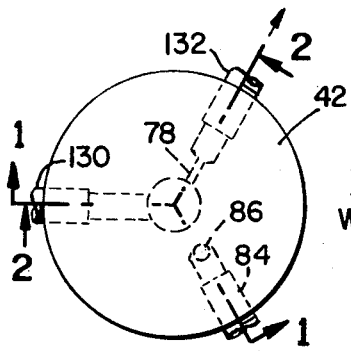
FIG_3
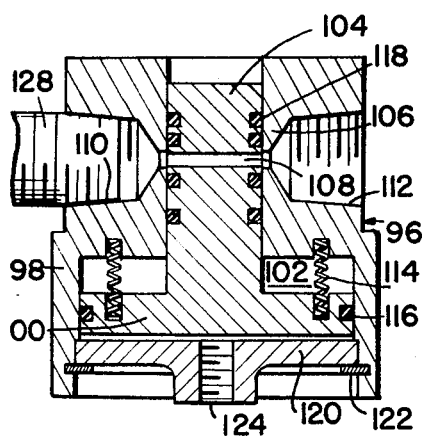
FIG_4
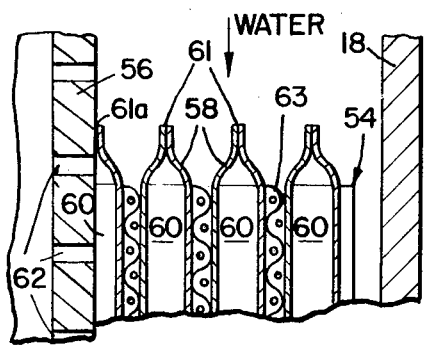
FIG_5
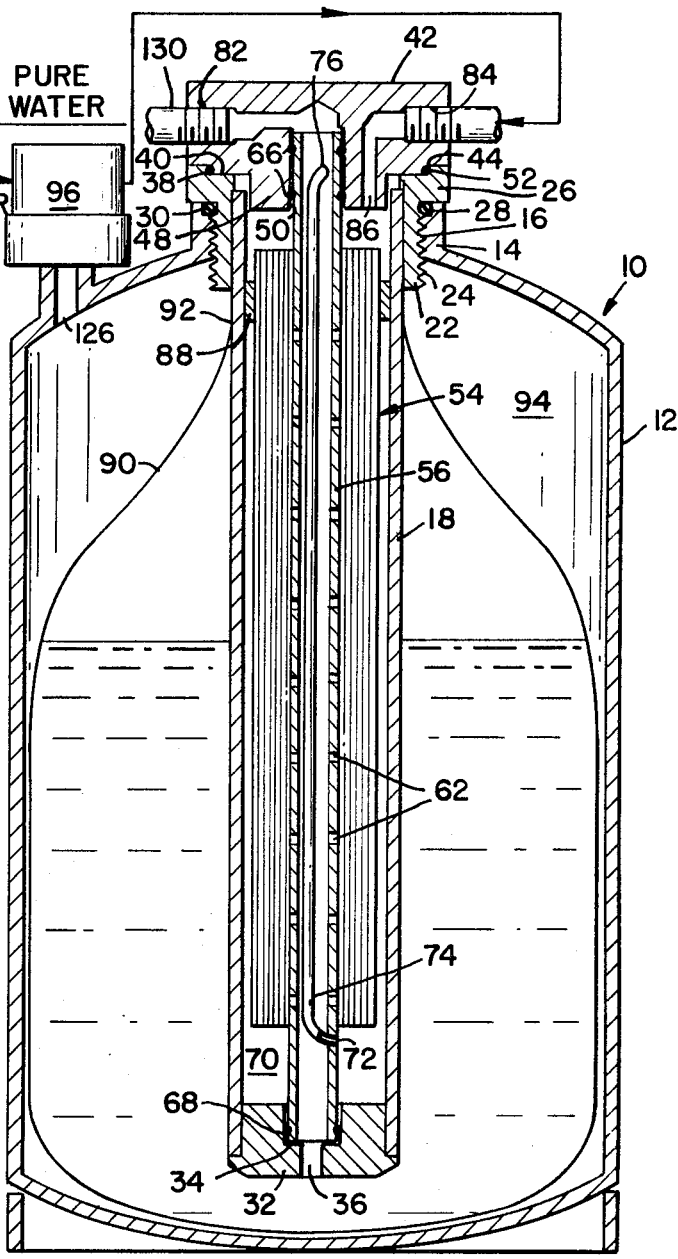
FIG_1
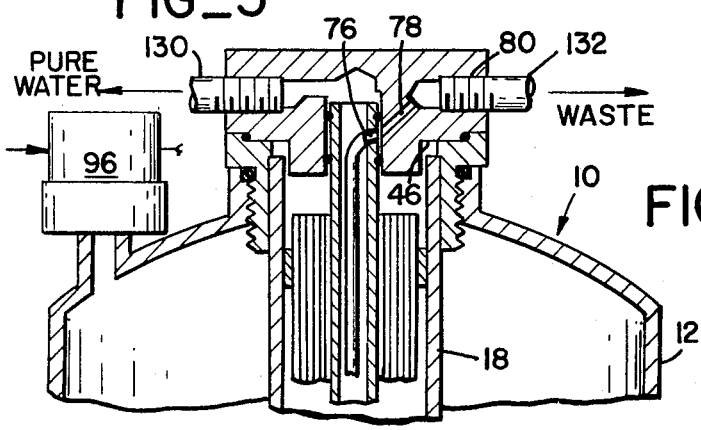
FIG_2
INVENTOR.
TIMOTHY M. CLARK
HENRY SHANFIELD
DAVID L. GRUNAU
Owen, Wickersham & Erickson
ATTORNEYS

REVERSE OSMOSIS WATER PURIFIER

This invention relates to water purification apparatus and more particularly to a relatively small compact apparatus that is adaptable for installation in homes, hospitals, schools, offices and elsewhere where moderate amounts of purified water are needed for human consumption and especially where the water supply available contains various dissolved minerals or other impurities such as minute solid particles.

In the field of water purification, membranes have been developed utilizing the reverse osmosis principle for removing dissolved minerals and solid particles up to 0.05 micron from water. An example of such membranes and elements using them is described in U.S. Pat. No. 3,367,504. While such elements have been incorporated in relatively large industrial water purifiers, the prior art heretofore failed to provide a practical water purification apparatus for homes and the like. Such devices heretofore devised have been overly large, complicated, difficult to install and service and also expensive. A particular problem with such purifiers prior to the present invention was that of extracting the purified or product water and then supplying it to an operable tap for use. A simple gravity system can be used if the purifier can be mounted at a level above a dispensing outlet. However, this makes installation of the purifier impractical and expensive. Providing a pump to remove the product water adds another degree of mechanical complication and expense.

A general object of the present invention is to provide a water purifier that solves the aforesaid problems.

Another object of the present invention is to provide a water purifier apparatus particularly adaptable for installation in homes and the like that will produce purified water under pressure at a dispenser outlet whether it is mounted above or below the outlet.

A more specific object of the present invention is to provide a water purifying unit that is enclosed within a pressurized storage tank so that air pressure within the tank can be utilized to dispense the purified water produced. This enables our apparatus to be installed in any convenient location such as a cabinet under a kitchen sink without the necessity of relying on gravity or extra pumps to feed the purified water to a dispensing outlet.

Another object of the present invention is to provide a water purifying unit that is easy to install and maintain and in which the element can quickly and easily be removed for replacement, cleaning or inspection.

Yet another object of the present invention is to provide a water purifying unit which is particularly well adapted for ease and economy of manufacture.

Another object of the present invention is to provide a water purifying unit which can be made small and compact and is particularly adaptable for use in combination with apparatus for heating or cooling the purified water to make it useful with various food and drink preparations.

Another object of the present invention is to provide a water purifying unit utilizing a reverse osmosis element that remains immersed within the product water and thereby maintains the water free from contamination until used.

The aforesaid and other objects are accomplished by a closed tank that is air tight except for its normal openings and structurally capable of withstanding pressure well above atmosphere. An open neck of the tank supports a unit that extends into it and includes a housing for a reverse osmosis element. A cover member that fits over the open neck has three radially directed passages, one of which is connected to a source of water to be purified. Another passage in the cover member is for the product water and is aligned with the upper end of a hollow tube for the element. The third passage provides the outlet for the waste or concentrate water which passes through the element but not through its membranes. A flexible bladder surrounds the unit within the tank and collects the product water from the bottom of the tube. The air in the tank surrounding the bladder is initially pressurized when the unit is installed so that it will force out the product water even when a small amount is in the bladder. A flow control valve in the supply water conduit to the cover member is controlled by air pressure from the tank. When the volume of product water in the bladder decreases, the air pressure is reduced accordingly and when it reaches a lower limit the valve actuates to open and allow supply water to flow to the element. When the tank becomes filled with product water, the valve on the supply water conduit automatically closes.

Other objects, advantages and features of the present invention will become apparent from the following detailed description of one embodiment presented in conjunction with the accompanying drawings, in which:

FIG. 1 is a view in side elevation and in section showing an apparatus embodying the principles of the present invention and taken along the line 1—1 of FIG. 3;

FIG. 2 is a fragmentary view in elevation and in section showing the upper part of our apparatus and taken along the line 2—2 of FIG. 3;

FIG. 3 is a plan view showing the top end of the apparatus of FIG. 1;

FIG. 4 is an enlarged view in cross section showing the flow control valve for our apparatus; and FIG. 5 is an enlarged fragmentary view showing a portion of a reverse osmosis element on the center tube.

Referring to the drawing, an apparatus 10 shown in FIGS. 1 and 2 comprises a tank or container 12. This container may have any suitable shape for a vessel that must withstand internal pressure, and it should be made of a strong, durable material such as stainless steel or a molded plastic. At its upper end the container has an upwardly extending cylindrical boss portion 14 forming a threaded opening 16. Seated within this opening is an elongated tubular housing 18 that extends downwardly into the tank 12. This housing is preferably made of a plastic material such as polyvinyl chloride (PVC) and has a collar 22 fixed to its upper end. This collar has a barrel portion with external threads 24 that match those of the opening 16 and an annular flange 26 that is integral with the barrel portion. The flange extends over the end of the boss portion and over a sealing ring 28 that is seated in a circular recess 30 in the boss portion 14. Thus, when the barrel portion of the collar is threadedly secured within the boss portion, the flange 26 presses against and forms a fluid tight seal with the ring 28.

At its lower end inside the tank, the tubular housing 18 is fixed to an end plug 32. This plug has a cylindrical recess 34 on its upper side within the tubular body member, and a port 36 extends from the recess completely through the end plug.

The top face of the collar flange 26 has an annular shoulder 38 spaced inwardly from its outer edge that forms an annular recess 40. A circular top cover member 42 has an annular shoulder 44 on its bottom side that is somewhat smaller in diameter than the shoulder 38, and inwardly therefrom it forms an annular surface 46. Extending below the surface 46 is an annular boss portion 48 surrounding a central opening 50 in the cover member. A circular elastomeric sealing ring 52 is sized to fit inwardly from the shoulder 38, and when the cover member is in place the shoulder 44 presses the ring tightly against the shoulder 38 to form a fluid tight seal. Simultaneously the surface 46 is adjacent to the surface of the recess 40 and the annular boss portion extends slightly into the upper end of the tubular body member 18.

The reverse osmosis element 54 for the apparatus 10 is supported within the tubular housing 18 between the top cover member 42 and the bottom end plug 32. This element is preferably a spiral wound type and is mounted on a plastic tube 56. As shown in FIG. 5, the spiral module consists substantially of a sandwich of two sheets of membrane 58 separated by a porous support or backing material 60. This backing supports the membrane under operating pressure and provides a path for leading off the purified water. This is sealed around three side edges 61 while the fourth side is lapped over and sealed at 61a to the hollow tube 56 which has spaced apart perforations 62 along its length. This envelope is then rolled up around the central tube in the form of a spiral, as shown. A mesh spacer 63 is introduced between the facing membrane surfaces to provide passageways for the concentrate or reject water to flow axially between spiral layers. Although a spiral type element is a preferred form, other types of reverse osmosis elements could be used within the scope of the invention.

The central tube 56 is preferably made of plastic (e.g. PVC) the same as the top cover member, and the element housing. At its upper end that extends above the end of the spiral element 54 are a pair of spaced apart elastomeric sealing rings 66 and that are seated in grooves in the outer surface of the tube. A similar sealing ring 68 is seated in a groove located near the lower end of the tube. The rings 66 are sized so that the upper end of the tube will fit tightly within the opening 50 in the top cover member. Similarly, the ring 68 enables the lower end of the tube to fit snugly within the recess 34 in the lower plug member 32.

The lower end of the element 54 is spaced well above the end plug 32 when the apparatus is properly assembled so that an annular chamber 70 is formed around the lower end of the tube 56. Within the wall of the tube portion below the element membrane and thus exposed to the chamber 70 is an opening 72 to a concentrate exit tube 74 mounted within the central tube 56. The upper end of this concentrate exit tube terminates at an outlet opening 76 in the central tube located axially between the ring sealing members 66. The concentrate thus discharges into the annular chamber formed by ring sealing members 66 and the clearance between the central tube and the top cover member, and leaves through an orifice 78 that connects with an outlet 80.

The outside diameter of the concentrate tube is considerably smaller than the inside diameter of the central tube so that it does not appreciably restrict flow through it. The ends of the tube 56 are, of course, open, the bottom end being aligned with the port 36 and the upper end being aligned with another radially directed outlet 82 having internal threads. In addition to the outlets 80 and 82 for concentrate and purified water respectively, the cover member has a third radially directed passage 84, as seen in FIGS. 1 and 3, through which the incoming water to be purified is supplied. This passage also has internal threads so that it can be readily connected by standard fittings to a water supply source. As shown in FIG. 1, the passage 84 directs incoming water to the open end of the element through a downwardly extending passage 86 within the annular portion 48 of the cover member. Near the upper end of the element 54 near the water inlet passage is an annular elastomeric band-like sealing member 88 that prevents any incoming water from flowing past the element to the bottom end of the housing.

Surrounding the element housing 18 within the container is a flexible bag or bladder 90 for collecting the product water that flows from the lower end of the tube 56. This bag is made of a suitable material which is preferably elastomeric so that it can expand as the volume of product water increases. The upper neck portion 92 fits around the housing 18 and is sealed thereto by an adhesive or by some other suitable means. Around the bladder 90 is an air space that is initially pressurized to a preselected level (e.g. 0.5 psi) so that a compressive force is constantly exerted on the bladder tending to force product water out the outlet 82.

The water to be purified flows from a supply source through a valve 96 that is controlled by air pressure within the container or tank. As shown in FIG. 4 this valve comprises a housing 98 that supports a movable piston 100. A circular shaped head of the piston is movable within a lower portion of the housing that forms a cylindrical chamber 102. An integral stem portion 104 extends upwardly from the head of the piston and is slidable within a slightly larger neck portion 106 of the housing. This stem portion has a transverse passage 108 which, with the piston in its lowermost position, provides a connecting passage between an inlet recess 110 and an aligned outlet recess 112 in the housing neck portion. The piston head is normally urged by a pair of springs 114 to its lowermost position, but when it moves upwardly the stem portion also moves so that the passage is displaced from alignment with the recesses 110 and 112 thereby stopping fluid flow through them. A rubber sealing ring 116 provides for a fluid tight seal around the piston head and the inner wall of the chamber, and similar sealing rings 118 are provided in grooves on sides of the passage 108. An end cap 120 on the housing 98 is retained therein by a snap-ring 122 and is spaced a small distance from the end face of the piston. A central opening 124 in the end cap is connected by a suitable fitting to an opening 126 in the upper end of the vessel 12. Normally, the springs 114 have sufficient force to keep the piston down so that the passage 108 remains in the open position. However, when air pressure in the space 94 around the bladder 90 rises above a predetermined level, the piston moves up, thereby closing the passage 108 and shutting off the supply of water to the vessel and the filter element.

The size of the container or tank 12 and the elements 54 therein may vary and will be selected on the basis of the projected output requirements for the apparatus. For example, for home use, 5 gallons per day may be sufficient and an element capable of producing that amount may be selected. Using reverse osmosis membrane materials as previously described, the normal output per square foot of element area can be readily ascertained and therefore the element can be designed for any production rate desired. Because of the air pressure in the space 94 surrounding the bladder 90, the product water is always under pressure and will flow readily from a dispenser outlet even if it is located well above the apparatus. This allows the apparatus to be installed in various convenient locations. For example, in a home it may be installed under a sink or in a small cabinet. In such an installation, an inlet line 128 to the control valve 96 is merely connected to the water supply line for the house and the pure or product water line 130 is connected to a suitable dispensing valve (not shown). The concentrate outlet 80 is connected to a suitable drain line 132. When air pressure in the container is below a critical level as when the bladder is not filled, the valve 96 remains open and allows water to flow through the inlet 84 of the cap member to the element inside the housing 18. The inlet or supply water pressure forces the water into the element and by the reverse osmosis process a certain amount of it passes through the membrane layers 58 and through the perforations 62 in the center tube. In doing so, dissolved minerals and all solids larger than around 0.05 micron are stopped by the membrane so that only pure water passes into the center tube. Since only a small percentage of the water passes through the membrane by reverse osmosis, the remaining water is forced between the spiral membrane layers and flows axially to the chamber 70 at the bottom of the element. This concentrate of dissolved minerals and foreign solid particles is now forced into the inlet 72 of the concentrate tube 74, up the tube, and through its outlet 76 and the orifice 78 to the concentrate drain line 132. As the product water passes into the tube, it flows downwardly out through the port 36 in the end cap 32 of the housing 18 and into the flexible bladder 90 surrounding the housing. As the bladder fills, it further compresses the air surrounding it within the container. This increased air pressure is furnished to the valve 96 and when the pressure reaches a predetermined critical level the valve closes, as previously described, to stop the supply of inlet water to the apparatus. As soon as enough product water is removed from the bladder to reduce the pressure to the valve, it reopens and allows more unpurified water to enter the element. However, the air pressure in the vessel is always sufficient to force the product water from the vessel under pressure.

When the tap water supply is shut off by the pressure of the trapped air in the space 94 acting on the valve 96, a temporary condition of forward osmosis will occur. Purified water will slowly flow back through the element and out the open drain orifice 78. This occasional flow has a beneficial effect in the operation of our apparatus because it serves to flush the inner surface pores of the element of foreign particles and brine and thereby helps to maintain its operative efficiency. Once the air pressure decreases to the level that allows the valve to reopen, the forward osmosis and its flushing action will cease.

From the foregoing it should be apparent that the present invention provides a highly versatile and efficient water purifying apparatus. The apparatus can be quickly and easily installed by merely connecting it to a conventional water supply source and a drain outlet. Thus, it is particularly adaptable for the production of drinking water in homes and other places where the tap water normally contains distasteful or harmful minerals and other impurities. It is also adaptable for use in combination with other apparatus that may heat or cool the purified water so that it can be used in different food or drink preparations.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An apparatus for purifying, storing and dispensing water suitable for drinking purposes which is derived from a supply of water containing undesired components and having an elevated hydraulic pressure, said apparatus comprises:

an airtight tank forming a reservoir with means capable of retaining air under pressure;

a membrane unit located within said tank for separating purified water from the supply water by reverse osmosis;

an inlet means in fluid communication with said reverse osmosis unit for conducting supply water thereto;

a first outlet means for leading purified water from said reverse osmosis unit to said reservoir;

a second outlet means for discharging the waste water from said reverse osmosis unit;

and means surrounding said membrane unit for trapping purified water from said membrane unit and responsive to air pressure within said reservoir means for forcing the trapped purified water through said first outlet means of said tank.

2. The apparatus as described in claim 1 including valve means responsive to a change in pressure in said means surrounding said membrane unit for controlling the entry of water into said membrane unit.

3. The apparatus as described in claim 1 wherein said means surrounding said membrane unit in said tank comprises a flexible, expandable bladder which receives product water purified by said reverse osmosis unit.

4. The apparatus as described in claim 1 wherein said tank has a generally cylindrical shape with an opening at one end, a cover means secured in said opening and connected to said unit.

5. The apparatus as described in claim 4 wherein said membrane unit comprises an elongated housing, a reverse osmosis element within said housing, said element having a central tube held in place by said cover member at one end and by said housing at its other end.

6. The apparatus as described in claim 5 including a smaller tube within said central tube for carrying waste water passing through said element to said second outlet means.

7. The apparatus as described in claim 6 wherein said central tube, said smaller tube, said housing and said cover means are all plastic material.

* * * * *